(12) United States Patent
Harris et al.

(10) Patent No.: US 11,943,244 B2
(45) Date of Patent: Mar. 26, 2024

(54) ANOMALY DETECTION OVER HIGH-DIMENSIONAL SPACE

(71) Applicant: International Business Machines Corporation, Armonk, NY (US)

(72) Inventors: Bradley Evan Harris, Sandy Springs, GA (US); Moazzam Khan, Marietta, GA (US); James Heinlein, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 17/353,856

(22) Filed: Jun. 22, 2021

(65) Prior Publication Data
US 2022/0407878 A1    Dec. 22, 2022

(51) Int. Cl.
*H04L 9/40*    (2022.01)
*G06N 5/02*    (2023.01)
(Continued)

(52) U.S. Cl.
CPC ......... *H04L 63/1425* (2013.01); *G06N 5/027* (2013.01); *G06N 5/04* (2013.01); *G06N 20/00* (2019.01)

(58) Field of Classification Search
CPC .................................................. H04L 63/1425
See application file for complete search history.

(56) References Cited

U.S. PATENT DOCUMENTS 8,873,836 B1    10/2014    Dietrich
9,104,744 B2    8/2015    Buryak
(Continued)

FOREIGN PATENT DOCUMENTS

CN    106528850 B    3/2017
CN    108234463 A    6/2018
(Continued)

OTHER PUBLICATIONS

D. Lin, A. Li and R. Foltz, "BEAM: An Anomaly-Based Threat Detection System for Enterprise Multi-Domain Data," 2020 IEEE International Conference on Big Data (Big Data), Atlanta, GA, USA, 2020, pp. 2610-2618. (Year: 2020).*

(Continued)

*Primary Examiner* — Kari L Schmidt
(74) *Attorney, Agent, or Firm* — Randy Tejeda (57) ABSTRACT

One or more computer processors create a binary cluster of events by bootstrapping a set of ground truths contained with a rule engine applied to a set of high-dimensional datapoints, wherein the binary cluster contains two clusters each containing a plurality of high-dimensional datapoints; determine one or more peer groups for a set of unknown high-dimensional datapoints utilizing a trained multiclass classifier, wherein the high-dimensional datapoints are assigned to one or more peer groups by the trained multiclass classifier using an incremental learning algorithm in order to reduce system resources; create an activity distribution for each unknown high-dimensional datapoint associated with a user in the set of unknown high-dimensional datapoints and each peer group; calculate a deviation percentage between the activity distribution of the user and each peer group associated with the user; and responsive to exceeding a deviation threshold, classify the user or associated high-dimensional datapoints as risky.

20 Claims, 3 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 9,166,993 B1* | 10/2015 | Liu | H04L 63/1425 |
| 9,530,104 B1 | 12/2016 | Laptev | |
| 9,729,571 B1* | 8/2017 | Ferguson | H04L 63/1408 |
| 10,685,188 B1 | 6/2020 | Zhang | |
| 10,917,420 B2 | 2/2021 | Matselyukh | |
| 11,227,232 B2* | 1/2022 | Chari | H04L 63/1425 |
| 11,676,072 B1* | 6/2023 | Chandrasekharan | G06F 18/23 706/12 |
| 2004/0103108 A1* | 5/2004 | Andreev | G06F 16/285 706/50 |
| 2015/0058982 A1* | 2/2015 | Eskin | G06F 16/84 726/23 |
| 2015/0161114 A1 | 6/2015 | Buryak | |
| 2016/0300252 A1* | 10/2016 | Frank | G06F 21/6245 |
| 2017/0061322 A1* | 3/2017 | Chari | H04L 63/1425 |
| 2018/0167402 A1* | 6/2018 | Scheidler | G06N 20/00 |
| 2018/0316707 A1* | 11/2018 | Dodson | H04L 43/16 |
| 2019/0349391 A1* | 11/2019 | Elsner | H04L 63/1425 |
| 2020/0151616 A1 | 5/2020 | Mermoud | |
| 2020/0250527 A1 | 8/2020 | Zhao | |
| 2020/0334498 A1* | 10/2020 | Pan | G06N 5/025 |
| 2021/0073658 A1* | 3/2021 | Poole | G06Q 30/0633 |
| 2021/0232291 A1* | 7/2021 | Abdulaal | H04L 41/22 |
| 2021/0336980 A1* | 10/2021 | Saunders | G06F 16/2237 |
| 2021/0385232 A1* | 12/2021 | Kutt | H04L 63/145 |
| 2022/0067752 A1* | 3/2022 | Fang | H04L 63/20 |
| 2022/0270598 A1* | 8/2022 | Bastide | H04L 67/535 |
| 2022/0279045 A1* | 9/2022 | Movshovitz | H04L 67/142 |

FOREIGN PATENT DOCUMENTS

| | | |
|---|---|---|
| CN | 108605036 A | 9/2018 |
| CN | 110866030 A | 3/2020 |
| CN | 111461354 A | 7/2020 |
| CN | 111507376 A | 8/2020 |
| EP | 0536504 B1 | 11/1997 |
| WO | 2019060327 A1 | 3/2019 |
| WO | 2020126339 A1 | 6/2020 |

OTHER PUBLICATIONS

H. He and K. Nawata, "Anomaly Detection in Peer-to-Peer Lending Transaction Records by Visualizing High Dimensional Heterogeneous Data," 2019 2nd International Conference on Safety Produce Informatization (IICSPI), Chongqing, China, 2019, pp. 421-424. (Year: 2019).*

Edward Toth and Sanjay Chawla. 2018. Group Deviation Detection Methods: A Survey. ACM Comput. Surv. 51, 4, Article 77 (Jul. 2019), pp. 1-38 (Year: 2019).*

Gepperth et al., "Incremental Learning Algorithms and Applications", Apr. 27-27, 2016, ISBN 978-287587027-8, 112 pages, <https://www.elen.ucl.ac.be/Proceedings/esann/esannpdf/es2016-19.pdf>.

Kumar Alapati, Yaswanth, "Combining Clustering With Classification: A Technique To Improve Classification Accuracy", vol. 5 No. Nov. 6, 2016, ISSN: 2319-7323, 3 pages, <www.ijcse.net/docs/IJCSE16-05-06-026.pdf>.

Luna et al., "Classification via clustering to predict final marks based on student participation in forums", ResearchGate, Article • Jan. 2012, 5 pages, <https://www.researchgate.net/publication/284379318_Classification_via_clustering_for_predicting_final_marks_based_on_student_participation_in_forums.

International Search Report and Written Opinion, International Application No. PCT/IB2022/054851, dated Aug. 25, 2022, 9 pages.

* cited by examiner

ANOMALY DETECTION OVER HIGH-DIMENSIONAL SPACE

BACKGROUND

The present invention relates generally to the field of machine learning, and more particularly to anomaly detection over high-dimensional space.

User behavior analytics (UBA) is a cybersecurity process to detect insider threats, targeted attacks, financial fraud, etc. UBA solutions consider patterns of human behavior and apply algorithms and statistical analysis to detect meaningful anomalies from those patterns (e.g., anomalies that indicate potential threats).

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

SUMMARY

Embodiments of the present invention disclose a computer-implemented method, a computer program product, and a system. The computer-implemented method includes one or more computer processors creating a binary cluster of events by bootstrapping a set of ground truths contained with a rule engine applied to a set of high-dimensional datapoints, wherein the binary cluster contains two clusters each containing a plurality of high-dimensional datapoints. The one or more computer processors determine one or more peer groups for a set of unknown high-dimensional datapoints utilizing a trained multiclass classifier, wherein the high-dimensional datapoints are assigned to one or more peer groups by the trained multiclass classifier using an incremental learning algorithm in order to reduce system resources. The one or more computer processors create an activity distribution for each unknown high-dimensional datapoint associated with a user in the set of unknown high-dimensional datapoints and each peer group. The one or more computer processors calculate a deviation percentage between the activity distribution of the user and each peer group associated with the user. The one or more computer processors responsive to exceeding a deviation threshold, classify the user or associated high-dimensional datapoints as risky.

DETAILED DESCRIPTION

Currently, there is no method to test the accuracy of a machine learning based anomaly detector built into user behavior analytics (UBA). Current UBA methods artificially limit the number of users and events that a system can track due to cost constraints associated with building and maintaining systems sufficient for efficient performance when evaluating new datapoints (e.g., events). Further, traditional clustering methods that are popular with current UBA systems are laborious and resource inefficient. Embodiments of the present invention improve current UBA systems and associated anomaly detectors by reducing system requirements while maintaining highly accurate systems. Embodiments of the present invention reduce system resource requirements by utilizing a binary vector for the event categories such that each event is represented only using 188 bytes. Embodiments of the present invention improve system performance by scaling the evaluation of high-dimensional data through automatic labeling of datapoints using a rule based engine with optimized rules. Embodiments of the present invention recognize that this correlation allows the system to function in a more reliable manner while determining the accuracy of the UBA machine learning based anomaly detection system/engine. Embodiments of the present invention improve scoring reliability through the use of fuzzy labels as a third class, rather than utilizing a score, to be assigned to an existing class as applied to the evaluation of an unknown datapoint. Embodiments of the present invention reduce system requirements through the utilization of incremental training with large datasets. Embodiments of the present invention provide robust security orchestration, automation, and response capabilities. Implementation of embodiments of the invention may take a variety of forms, and exemplary implementation details are discussed subsequently with reference to the Figures.

The present invention will now be described in detail with reference to the Figures.

Figure 1:
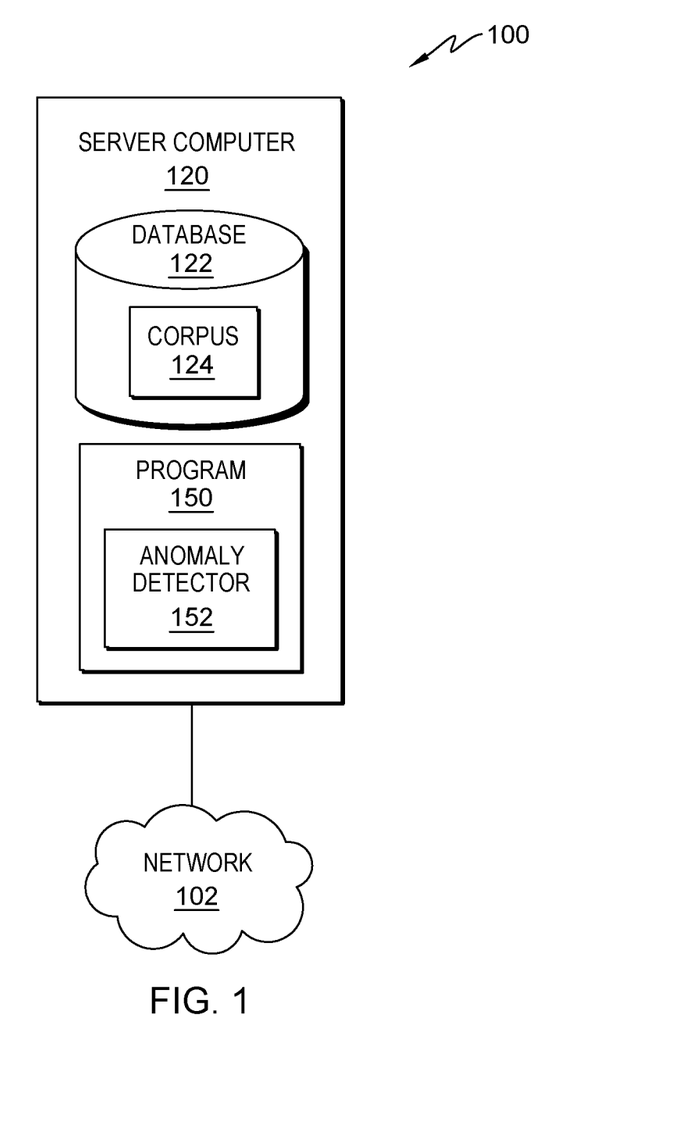
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 contains corpus 124. Corpus 124 contains a plurality of ground truths with associated events (i.e., information that is known to be true). In an embodiment, the contained ground truths include user and entity events contained in identity logs, device logs, domain name service (DNS) logs, application logs, database logs, and network logs. Here, program 150 mines UBA to reveal anomalies, even when said anomalies occur at a low frequency and over extended periods of time. In an embodiment, program 150 collects and stores information, associated with one or more users, from access logs, authentication logs, account changes, network logs (e.g., proxies, firewalls, IPS, and VPNs), endpoint and application logs.

Program 150 is a program for scaling anomaly detector evaluations over high-dimensional space. In various embodiments, program 150 may implement the following steps: create a binary cluster of events by bootstrapping a set of ground truths contained with a rule engine applied to a set of high-dimensional datapoints, wherein the binary cluster contains two clusters each containing a plurality of high-dimensional datapoints; determine one or more peer groups for a set of unknown high-dimensional datapoints utilizing a trained multiclass classifier, wherein the high-dimensional datapoints are assigned to one or more peer groups by the trained multiclass classifier using an incremental learning algorithm in order to reduce system resources; create an activity distribution for each unknown high-dimensional datapoint associated with a user in the set of unknown high-dimensional datapoints and each peer group; calculate a deviation percentage between the activity distribution of the user and each peer group associated with the user; and to exceeding a deviation threshold, classify the user or associated high-dimensional datapoints as risky. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes anomaly detector 152. Program 150 is depicted and described in further detail with respect to FIGS. 2 and 3.

Anomaly detector 152 is representative of a model utilizing deep learning techniques to train, calculate weights, ingest inputs, and output a plurality of solution vectors (e.g., user risk scores based on associated events). Anomaly detector 152 is utilized by program 150 for risk profiling and unified user identities. Anomaly detector 152 profiles risk by assigning risk to different security use cases. Risk is assigned to each event associated with a user and increases risk depending on the severity and reliability of the detected event. In an embodiment, anomaly detector 152 generates security insights and profile risks of users. In a further embodiment, program 150 provides full data security and audit data visibility, real-time controls and automated workflows that span disparate data environments. In another embodiment, program 150 utilizes events contained in corpus 124 to make recommendations based on sales trends, analyze usage and user preferences for existing and future product releases, determine how users interact with an application to predict future usage and preferences, and detect compromised credentials and insider threats by locating anomalous behavior. In an embodiment, anomaly detector 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, anomaly detector 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. The training of anomaly detector 152 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
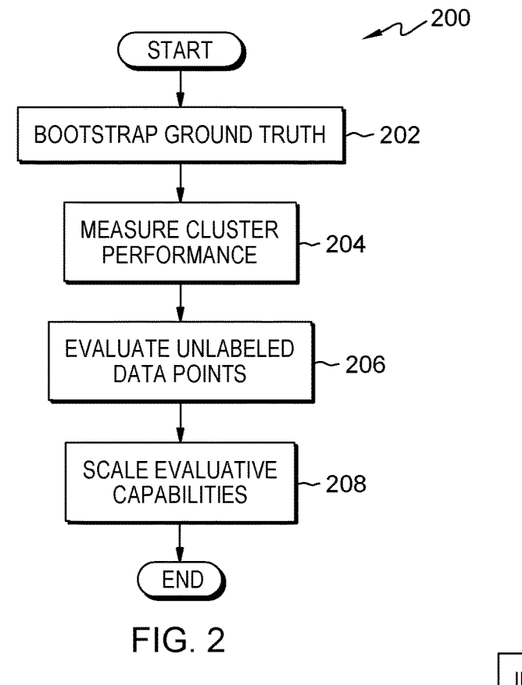
FIG. 2 is a flowchart depicting operational steps of a program, on a server computer within the computational environment of FIG. 1, for scaling anomaly detector evaluations over high-dimensional space, in accordance with an embodiment of the present invention.

FIG. 2 depicts flowchart 200 illustrating operational steps of program 150 for scaling anomaly detector evaluations over high-dimensional space, in accordance with an embodiment of the present invention.

Program 150 bootstraps ground truth (step 202). In an embodiment, program 150 initiates responsive to a retrieved or inputted training set or set of ground truths. In another embodiment, program 150 initiates responsive to a request for UBE classification of one or more events and/or users. Program 150 bootstraps ground truth by identifying trigger rules, aggregating the identified trigger rules into a labeled dataset with associated binary choices; correlating the aggregated dataset with representation in high-dimensional space; and clustering the labeled high-dimensional datapoints.

Program 150 measures cluster performance (step 204). In an embodiment, responsive to the clustered high-dimensional datapoints, program 150 labels each datapoint with labeled generated through the identification of the trigger rules, as described in step 302. Responsive to the applied labels, program 150 utilizes a classification metric (e.g., confusion matrix, receiver operator characteristic (ROC) curve, precision-recall curve, logarithmic loss, silhouette coefficient, etc.) to evaluate the correctness of the utilized clustering algorithm. In another embodiment, program 150 utilizes any desired classification metric to compare the clustering algorithm performance against the ground truth established by the identified rules. Said metrics allow program 150 to directly compare the measurement of ground truth between the output of anomaly detector 152 and the results of the ground truth generated from the rules bootstrapped in step 202 and steps 302-308. In the previous embodiments, program 150 calculates said metrics as if the classifier had been trained based upon ground truth as opposed to predicted values thus fostering a reliable method of collecting evaluative metrics.

Responsively, program 150 calculates a majority class for each cluster utilizing the aforementioned labels. In an embodiment, if program 150 utilizes a pure assignment algorithm, then program 150 skips calculating the majority class of each cluster. In this embodiment, the clustering algorithm itself serves as a predictor, thus no classifier is needed. In the situation where the corresponding clustering algorithm creates overlapping clusters (i.e., clusters with shared datapoints), program 150 utilizes fuzzy labelling in which program 150 assigns a score or probability for each of the true labels identified above. In an embodiment, program 150 assigns the class or label with the highest associated score or probability. For example, program 150 labels either an event or a user utilizing the corresponding score, or, alternately, an additional fuzzy label is created and assigned.

If said fuzzy label is created, then program 150 recalculates classification metrics to account for the additional fuzzy label. In an embodiment, program 150 utilizes the fuzzy label as an alternative class in order to compare the fuzzy label to the two ground truth classes (e.g., binary cluster). If a fuzzy label matches a particular ground truth class while exceeding a certain threshold of the classification metric, then program 150 randomly assigns the overlapping datapoints (i.e., events) as one ground truth class of or the other. In another embodiment, program 150 presents the datapoints and associated information to a user and assigning said datapoints based on a user response. In another embodiment, program 150 discards or deletes the overlapping datapoints. In an embodiment, program 150 applies the aforementioned embodiments to each datapoint in the labeled dataset. Step 204 results in a set of true labels and a set of labels assigned by a clustering algorithm.

Program 150 evaluates unlabeled datapoints (step 206). Program 150 subsequently calculates a label for unknown events associated with one or more users if the clustering algorithm, utilized in the steps above, has served as a reliable predictor. In an embodiment, program 150 utilizes a predetermined classification metric threshold to determine if the clustering algorithm is a reliable predictor (e.g., >90% classification accuracy). In a further embodiment, if program 150 determines that the clustering algorithm is not reliable, then program 150 adjusts clustering parameters (i.e., K clusters, etc.) and recalculate classification metrics. In a further embodiment, if program 150 determines that the clustering algorithm is reliable, then program 150 clusters unknown samples (unlabeled datapoints) into one of the two existing clusters contained in the binary cluster described in step 204. In an embodiment, the clusters are preconstructed per model and are not formed by collections of unknown events or users. In this embodiment, program 150 utilizes classification via clustering, allowing an unknown sample label to be predicted based upon which cluster the sample is most related to. Further, the clusters have been formed from the ground truth, thus this method should be more reliable. In an embodiment, program 150 continuously performs step 202-206 on a reoccurring basis at a predetermined frequency (i.e., user preference) in order to maintain the integrity of the preconstructed clusters, and thereby classification via clustering.

Program 150 scales evaluative capabilities (step 208). Program 150 scales the evaluative capabilities described in step 206 in order to support a large user base (e.g., >10000 users). The procedure described in steps 202-206 can be limited due to the system resource requirement of the high-dimensional datapoints, especially as the numbers of users increase. To compensate for such restrictions, program 150 trains and utilizes a multiclass classification algorithm, such as k-nearest-neighbors, multinomial naive Bayes, random forest, any deep learning solution with an output layer using softmax regression, or any similar algorithm which yields probabilities as outputs over high-dimensional datapoints. Program 150 extends the classification procedure from steps 202-206 from binary classification to multiclass classification. In an embodiment, program 150 maintains a set of defined peer groups, each peer group containing one or more users. In this embodiment, a user belongs to one or more peer groups. For example, user X could be both a developer, an administrator, or a member of both peer groups. In an embodiment, program 150 ensures that users are a part of one or more of peer groups, where peer groups yield a set of natural labels for a multiclass classifier.

In an embodiment, program 150 utilizes a plurality (e.g., 200,000 users) of clustered users to train the multiclass classifier, specifically input points are used to create the user clusters prior to a dimensionality reduction. Responsively, program 150 collects events which are identified as related to a particular peer group. For example, during multiclass classifier training, all datapoints contributing to a user labeled as "administrator", "developers", "hr", etc. are conglomerated together resulting in a set of datapoints labeled with a respective peer group. In another embodiment, events are mapped to multiple peer groups. In the situation of an event with multiple mapped peer groups, program 150 either duplicates the events and labels each event with a different label or program 150 utilizes multilabel learning in which an event belongs to multiple classes which must be predicted. In a further embodiment, program 150 utilizes activity distribution to perform peer group clustering to create a set of events in high dimensional space which are collected for use by the multiclass classifier. In order to account for large event datasets, program 150 utilizes incremental learning modifications of the aforementioned algorithms, where training will occur similarly to batch training but instead the models are incrementally fed learning training samples (e.g., clustered high-dimensional datapoints as described in step 206) thus preventing the requirement of large system resources. In this embodiment, incremental algorithms account for concept drift better than batch training thus avoiding overfitting.

Responsive to a trained classifier, program 150 evaluates each collected event to determine a respective peer group label. In an embodiment, program 150 utilizes the trained multiclass classifier to output a set of probabilities representing probable peer groups. In this embodiment, program 150 considers the top N probabilities of the result of the classification, where N is predetermined. For example, program 150 utilizes the top three probabilities to identify a peer group for an event. In an embodiment, if the correct peer group of a user appears in the top three probable labels, then program 150 considers the corresponding event to be safe or without increased risk. In this embodiment, the increase of N decreases the chance of a false positive. For example, a setting of N=1 represents an increased risk score if a user mapped to a specific peer group does not match the most probable label as determined by the classifier. In a further embodiment, each peer group has specific considerations. For example, program 150 handles an "administrators" group (as well as reports on peer groups not containing any valid users such as system or service accounts) as special peer group because on elevated permission requirements. In this example, if an event ranks in the top N probabilities as belonging to the "administrators" peer group and the corresponding user does not belong to that group then program 150 increases the user risk score and flags the event.

Program 150 creates an activity distribution for each user utilizing the multiclass classifier and compares each activity distribution against respective peer groups (i.e., aggregated activity distributions for a peer group based on constituent datapoints (i.e., events)). In an embodiment, the activity distribution for a user or entity is a set of events associated with said user or entity. For example, each event is defined by 1,500 associated categories or features. Program 150 utilizes activity distribution to calculate how much one or more events associated with the user deviate from that of an associated peer group or peer groups. For example, program 150 calculates deviation from a peer group by calculating a percentage representing how much a user has deviated from said peer group. In an embodiment, program 150 utilizes the created activity distribution as a feature vector for the multiclass classifier. In an embodiment, program 150 utilizes a binary vector to represent event categories. For example, program 150 utilizes the binary vector such that an event is represented in 188 bytes. Further, in the binary vector, one bit represents the presence or absence of a particular low-level category, further reducing the required amount of system storage and system processing. Responsive to a user or event exceeding a deviation threshold based on created activity distributions, program 150 evaluates the user or event as risky or assigns an elevated risk score indicating the level of risk.

In an embodiment, program 150 performs the classification procedure described above for every new event collected in a predetermined period, frequency, or pattern (e.g., every 7 days). In an embodiment, if the evaluations from clustering classifier, as described in steps 202-206, and the multiclass classifier concur and exceed a concurrence threshold, then for that period the classifier is not modified. In a further embodiment, if program 150 detects drift (i.e., degradation of prediction accuracy due to changes in the environment) in the classifiers, then evaluations from each classifier of historical periods are used as a base for the previous event while the datapoints classified via clustering for that same period are appended (i.e., reclassified). In this embodiment, program 150 utilizes incremental learning to account for the multiclass classifier slowly drifting, while maintaining a historical perspective of the data. Responsively, the multiclass classifier is retrained over this new set of samples, and a new model is created. Responsively, program 150 deploys the newly created model and continues to utilize said model when evaluates new unknown datapoints. In an example, responsive to the detection (i.e., evaluation) of one or more plurality of risky user events through the evaluation of unknown events collected from user network behavior, program 150 restricts user network activity, removes user permissions, and/or notifies an administrator with information regarding the user, identified risky events, and associated probabilities. In a further example, the notification includes classification metrics associated with the utilized clustering classifier and multiclass classifier.

Figure 3:
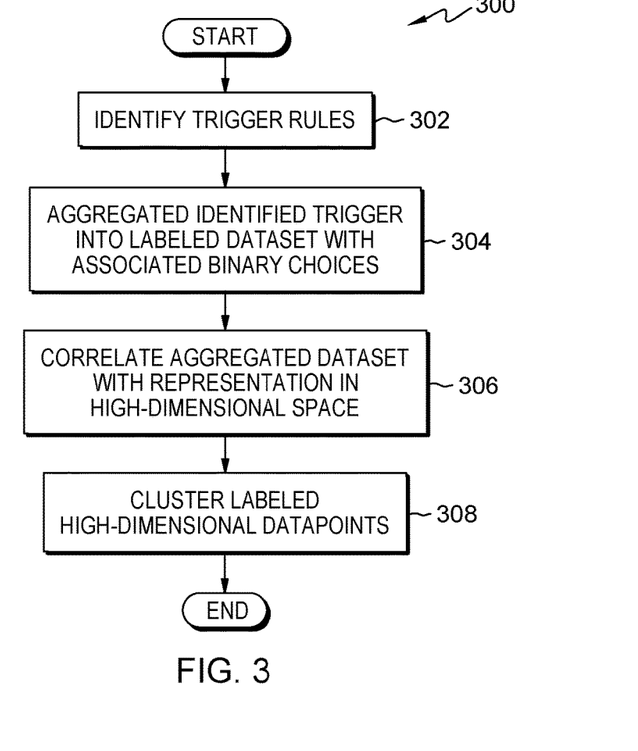
FIG. 3 is a flowchart depicting operational steps of a program, on a server computer within the computational environment of FIG. 1, for bootstrapping ground truths, in accordance with an embodiment of the present invention.

FIG. 3 depicts flowchart 300 illustrating operational steps of program 150 for bootstrapping ground truths, in accordance with an embodiment of the present invention.

Program 150 identifies trigger rules (step 302). In an embodiment, program 150 identifies a set of rules as applied by a rule engine over a set of events as contained within corpus 124. In this embodiment, program 150 identifies rules as applied to events which may or may not trigger said rules in order to create a set of ground truths that accurately describe the dataset. In a further embodiment, program 150 identifies and labels each event that trigger one or more rules (e.g., user risk score rules). In this embodiment, program 150 labels the remaining events (i.e., events that do not trigger any rules). In the aforementioned embodiments, said rules or set of rules are arbitrarily complex, but for each rule in the set of rules the end result is a binary choice of whether or not an associated score (i.e., user risk) increases. For example, if a rule is triggered on a specific even, an associated risk score increases (e.g., the user risk score for a user is increased), while if no rule triggered then the risk score is unchanged or reduced. Additionally, a user may trigger an arbitrary number of rules or none at all. In another embodiment, program 150 develops and maintains a set of all triggers identified by a plurality of events. In this embodiment, program 150 identifies a set of ground truths utilizing the maintained set of all triggers as expressed by the rule engine. For example, program identifies a set of ground truths relating to user risk elevation in a corporate environment.

Program 150 aggregates identified triggers into labeled dataset with associated binary choices (step 304). Responsive to the collection and identification of trigger rules, program 150 creates a labeled dataset of events and binary choices. For example, if an event has triggered a rule, program 150 labels the event as potentially malicious or risky. In another example, if the event does not trigger a rule, then program 150 labels the event as normal. In an embodiment, events are associated with users, and thus the final outcome of the rule evaluation is a user risk score.

Program 150 correlates the aggregated dataset with representation in high-dimensional space (step 306). In an embodiment, program 150 correlates the events within the labeled dataset with event representation in a high-dimensional space used by a machine learning clustering algorithm, further described in step 308. Here, program 150 uses a high-dimensional space where the labeled dataset is directly represented in a space spanned by constituent event attributes, with each event represented as a point in the space (i.e., high-dimensional datapoint) with its position depending on respective attribute values (e.g., labels or risk scores). In this embodiment, program 150 translates each labeled event in the labeled dataset into a respective point in high-dimensional space to be subsequently clustered, further described in step 308. For example, a translated point includes low level categories (e.g., risk categories) associated with the event and one or more corresponding rules or triggers.

Program 150 clusters the labelled high-dimensional datapoints (step 308). Responsive to a plurality of labelled high-dimensional datapoints, program 150 places each high-dimensional datapoint into a cluster or plurality of clusters utilizing a cluster algorithm (e.g., binary classifier, etc.). For example, program 150 clusters the labeled high-dimensional datapoints of events and draws said datapoints into a binary cluster containing two clusters. In an embodiment, program 150 utilizes a hierarchical agglomerative algorithm to force the assignment of datapoints to only two clusters. In another embodiment, program 150 utilizes any clustering algorithm (i.e., cluster classifier) where K is specified, such as K-Means or K-Medoids. In this embodiment, the clustering algorithm under test is the algorithm which denotes the increase in risk. Further, the cluster classifier algorithm purpose must match the purpose of the rules, described in step 302. In another embodiment, program 150 utilizes a density based clustering algorithm to responsively merge a plurality of clusters into two distinct clusters. In another embodiment, program 150 utilizes the same algorithm corresponding to anomaly detector 152. For example, if anomaly detector 152 uses a Sum of Norms algorithm, then program 150 utilizes the same algorithm for bootstrapping the ground truths and clustering. Step 308 results in a cluster classifier outputting a pair of clusters, where one cluster is composed of those events which indicate an increased risk, while the other is composed of those events which do not indicate an increased risk.

Figure 4:
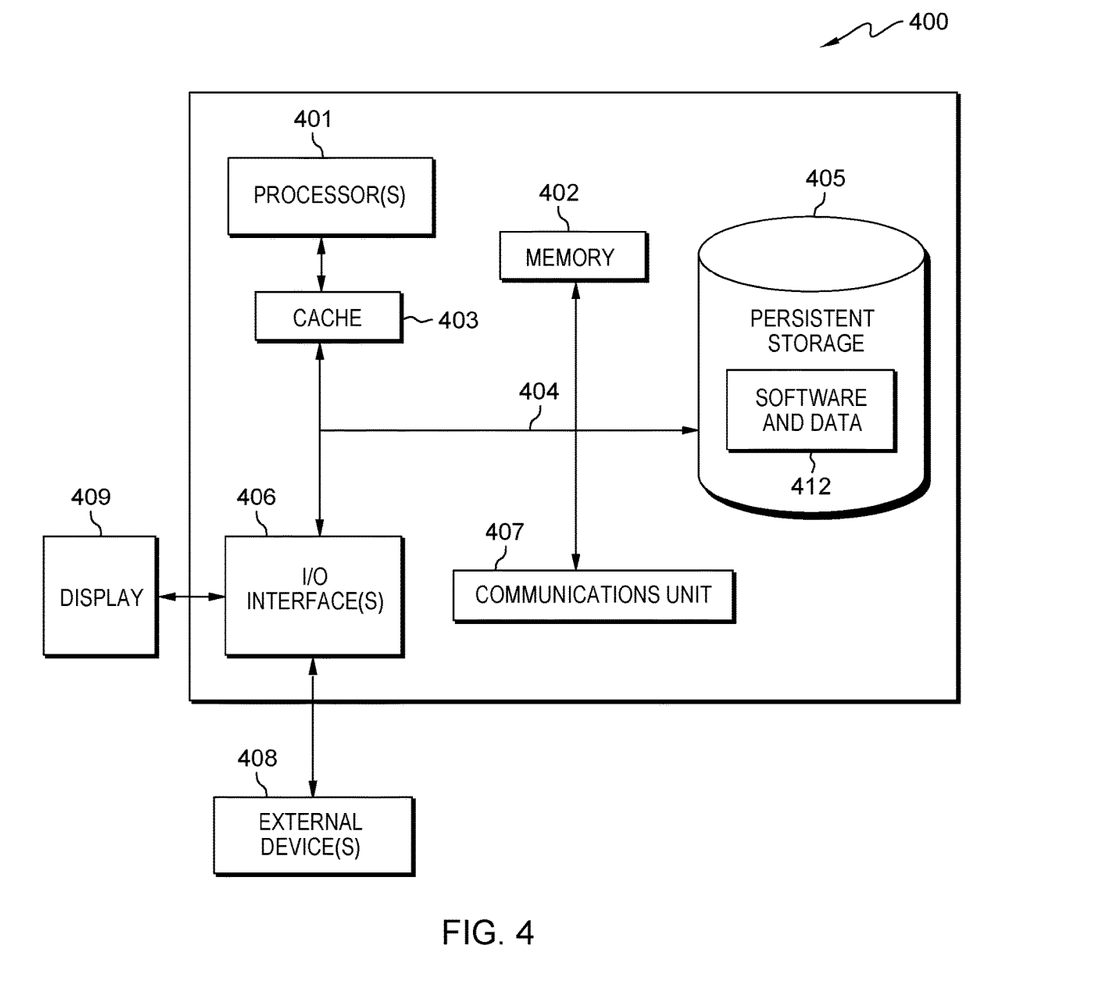
FIG. 4 is a block diagram of components of the server computer, in accordance with an embodiment of the present invention.

FIG. 4 depicts block diagram 400 illustrating components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    creating, by one or more computer processors, a binary cluster of events by bootstrapping a set of ground truths contained with a rule engine applied to a set of high-dimensional datapoints, wherein the binary cluster contains two clusters each containing a plurality of high-dimensional datapoints;
    determining, by one or more computer processors, one or more peer groups for a set of unknown high-dimensional datapoints utilizing a trained multiclass classifier, wherein the high-dimensional datapoints are assigned to one or more peer groups by the trained multiclass classifier using an incremental learning algorithm in order to reduce system resources;
    creating, by one or more computer processors, an activity distribution for each unknown high-dimensional datapoint associated with a user in the set of unknown high-dimensional datapoints and each peer group;
    calculating, by one or more computer processors, a deviation percentage between the activity distribution of the user and each peer group associated with the user; and
    responsive to exceeding a deviation threshold, classifying, by one or more computer processors, the user or associated high-dimensional datapoints as risky and performing an action.

2. The computer-implemented method of claim 1, further comprising:
    evaluating, by one or more computer processors, one or more unknown datapoints collected within a predetermined period utilizing a clustering classifier and the multiclass classifier;
    comparing, by one or more computer processors, the evaluation of the clustering classifier and the evaluation of the multiclass classifier; and
    responsive to detecting drift utilizing the comparison of evaluations from the clustering classifier and the multiclass classifier, utilizing, by one or more computer processors, evaluations from historical periods as a base for retraining the multiclass classifier.

3. The computer-implemented method of claim 1, wherein creating the binary cluster of events by bootstrapping the set of ground truths contained with the rule engine applied to the set of high-dimensional datapoints, wherein the binary cluster contains two clusters each containing the plurality of high-dimensional datapoints, comprises:
    identifying, by one or more computer processors, a set of rules as applied to a set of datapoints;
    creating, by one or more computer processors, a labeled set of datapoints and associated binary choices utilizing the identified set of rules, wherein the binary choices are determined by one or more rule triggers;
    correlating, by one or more computer processors, the set of high-dimensional datapoints within the labeled dataset with representation in a high-dimensional space, wherein the labeled dataset is directly represented in a space spanned by constituent datapoint attributes; and
    clustering, by one or more computer processors, the correlated high-dimensional datapoints into the binary cluster.

4. The computer-implemented method of claim 1, wherein the set of high-dimensional datapoints are events collected from access logs, authentication logs, account changes, network logs, and application logs.

5. The computer-implemented method of claim 1, further comprising:
    utilizing, by one or more computer processors, created activity distributions as feature vectors for the multiclass classifier.

6. The computer-implemented method of claim 1, wherein the action is network restriction for the user.

7. The computer-implemented method of claim 1, wherein the action is a notification.

8. A computer program product comprising:
    one or more computer readable storage media and program instructions stored on the one or more computer readable storage media, the stored program instructions comprising:
    program instructions to create a binary cluster of events by bootstrapping a set of ground truths contained with a rule engine applied to a set of high-dimensional datapoints, wherein the binary cluster contains two clusters each containing a plurality of high-dimensional datapoints;
    program instructions to determine one or more peer groups for a set of unknown high-dimensional datapoints utilizing a trained multiclass classifier, wherein the high-dimensional datapoints are assigned to one or more peer groups by the trained multiclass classifier using an incremental learning algorithm in order to reduce system resources;
    program instructions to create an activity distribution for each unknown high-dimensional datapoint associated with a user in the set of unknown high-dimensional datapoints and each peer group;
    program instructions to calculate a deviation percentage between the activity distribution of the user and each peer group associated with the user; and
    program instructions to responsive to exceeding a deviation threshold, classify the user or associated high-dimensional datapoints as risky and performing an action.

9. The computer program product of claim 8, wherein the program instructions, stored on the one or more computer readable storage media, further comprise:
    program instructions to evaluate one or more unknown datapoints collected within a predetermined period utilizing a clustering classifier and the multiclass classifier;
    program instructions to compare the evaluation of the clustering classifier and the evaluation of the multiclass classifier; and
    program instructions to, responsive to detecting drift utilizing the comparison of evaluations from the clustering classifier and the multiclass classifier, utilize evaluations from historical periods as a base for retraining the multiclass classifier.

10. The computer program product of claim 8, wherein the program instructions, to create the binary cluster of events by bootstrapping the set of ground truths contained with the rule engine applied to the set of high-dimensional datapoints, wherein the binary cluster contains two clusters each containing the plurality of high-dimensional datapoints, comprise:
- program instructions to identify a set of rules as applied to a set of datapoints;
- program instructions to create a labeled set of datapoints and associated binary choices utilizing the identified set of rules, wherein the binary choices are determined by one or more rule triggers;
- program instructions to correlate the set of high-dimensional datapoints within the labeled dataset with representation in a high-dimensional space, wherein the labeled dataset is directly represented in a space spanned by constituent datapoint attributes; and
- program instructions to cluster the correlated high-dimensional datapoints into the binary cluster.

11. The computer program product of claim 8, wherein the set of high-dimensional datapoints are events collected from access logs, authentication logs, account changes, network logs, and application logs.

12. The computer program product of claim 8, wherein the program instructions, stored on the one or more computer readable storage media, further comprise:
- program instructions to utilize created activity distributions as feature vectors for the multiclass classifier.

13. The computer program product of claim 8, wherein the action is network restriction for the user.

14. The computer program product of claim 8, wherein the action is a notification.

15. A computer system comprising:
- one or more computer processors;
- one or more computer readable storage media; and
- program instructions stored on the computer readable storage media for execution by at least one of the one or more processors, the stored program instructions comprising:
  - program instructions to create a binary cluster of events by bootstrapping a set of ground truths contained with a rule engine applied to a set of high-dimensional datapoints, wherein the binary cluster contains two clusters each containing a plurality of high-dimensional datapoints;
  - program instructions to determine one or more peer groups for a set of unknown high-dimensional datapoints utilizing a trained multiclass classifier, wherein the high-dimensional datapoints are assigned to one or more peer groups by the trained multiclass classifier using an incremental learning algorithm in order to reduce system resources;
  - program instructions to create an activity distribution for each unknown high-dimensional datapoint associated with a user in the set of unknown high-dimensional datapoints and each peer group;
  - program instructions to calculate a deviation percentage between the activity distribution of the user and each peer group associated with the user; and
  - program instructions to responsive to exceeding a deviation threshold, classify the user or associated high-dimensional datapoints as risky and performing an action.

16. The computer system of claim 15, wherein the program instructions, stored on the one or more computer readable storage media, further comprise:
- program instructions to evaluate one or more unknown datapoints collected within a predetermined period utilizing a clustering classifier and the multiclass classifier;
- program instructions to compare the evaluation of the clustering classifier and the evaluation of the multiclass classifier; and
- program instructions to, responsive to detecting drift utilizing the comparison of evaluations from the clustering classifier and the multiclass classifier, utilize evaluations from historical periods as a base for retraining the multiclass classifier.

17. The computer system of claim 15, wherein the program instructions, to create the binary cluster of events by bootstrapping the set of ground truths contained with the rule engine applied to the set of high-dimensional datapoints, wherein the binary cluster contains two clusters each containing the plurality of high-dimensional datapoints, comprise:
- program instructions to identify a set of rules as applied to a set of datapoints;
- program instructions to create a labeled set of datapoints and associated binary choices utilizing the identified set of rules, wherein the binary choices are determined by one or more rule triggers;
- program instructions to correlate the set of high-dimensional datapoints within the labeled dataset with representation in a high-dimensional space, wherein the labeled dataset is directly represented in a space spanned by constituent datapoint attributes; and
- program instructions to cluster the correlated high-dimensional datapoints into the binary cluster.

18. The computer system of claim 15, wherein the set of high-dimensional datapoints are events collected from access logs, authentication logs, account changes, network logs, and application logs.

19. The computer system of claim 15, wherein the program instructions, stored on the one or more computer readable storage media, further comprise:
- program instructions to utilize created activity distributions as feature vectors for the multiclass classifier.

20. The computer system of claim 15, wherein the action is network restriction for the user.

* * * * *